July 10, 1923.

A. JOHNSON 1,461,123

PRINTING ROLLER

Filed Sept. 18, 1920

WITNESSES
A. N. Murphy.
C. L. Waal.

INVENTOR
Andrew Johnson
By R. S. Caldwell
ATTORNEY the roller in proper position in its bearings.

UNITED STATES PATENT OFFICE.

ANDREW JOHNSON, OF MILWAUKEE, WISCONSIN.

PRINTING ROLLER.

Application filed September 18, 1920. Serial No. 411,207.

*To all whom it may concern:*

Be it known that I, ANDREW JOHNSON, a citizen of the United States, and resident of Milwaukee, county of Milwaukee, and State of Wisconsin, have invented new and useful Improvements in Printing Rollers, of which the following is a description, reference being had to the accompanying drawings, which are a part of this specification.

The invention relates to printing rollers. Printing rollers are usually provided with ends of reduced diameter forming bearing shoulders with the adjacent portions. The reduced ends fit in supporting brackets and the bearing shoulders, when the roller is new, have end thrust engagement with said brackets. Under use the surfaces of these bearing shoulders wear down and the roller becomes unstable. When this occurs it is the usual practice to take up the wear on the ends of the roller by inserting washers between the bearing shoulders and the brackets, but such practice is objectionable because the washers themselves on wearing have to be replaced and are generally lost every time the roller is taken off. To obviate these difficulties I have provided an adjustable end thrust collar for maintaining the roller in proper position in its bearings.

The invention further consists in the several features hereinafter set forth and more particularly defined by claim at the conclusion hereof.

Figure 1:
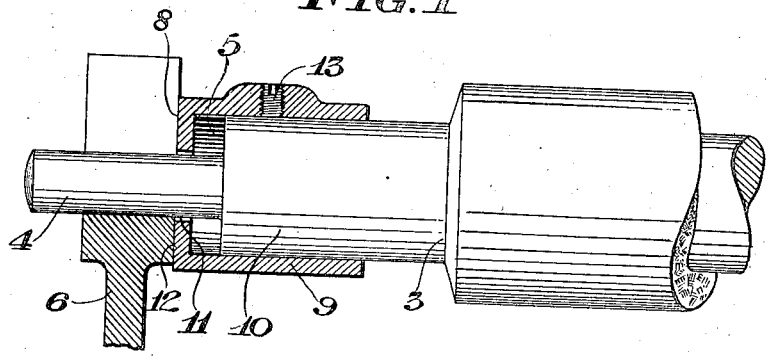
Figure 2:
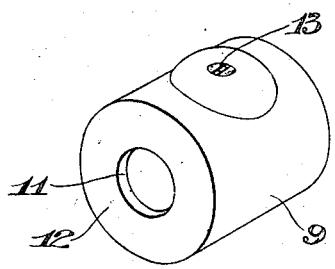

In the drawings: Fig. 1 is an end view of a printing roller equipped with the device embodying the invention, parts being shown in section; Fig. 2 is a perspective view of the device embodying the invention.

The printing roller 3, of usual construction, has an end 4 of reduced diameter and a shouldered portion 5 adjacent said end. The end 4 fits in a bearing bracket 6 and when the roller is new the surface of the shouldered portion 5 abuts against the side 8 of the bracket 6 and maintains the roller in proper position. Under use the shouldered portions 5 at the ends of the roller wear away with the result that the roller may move endwise and wabble in its bearings, and to prevent this I have provided a member 9 adapted to be secured at the end of the roller.

The member 9 is in the form of a collar or sleeve fitting the portion 10 of the roller and provided with a flanged end 11 which fits over the shouldered portion 5 of the roller and forms a bearing surface 12 adapted to engage the side 8 of the bracket. The member 9 may be adjustably secured to the roller in any suitable manner, for example, by a set screw 13 mounted in the collar and adapted to be screwed into clamping engagement with the roller.

With this construction as the bearing surface 12 of the member 9 wears down the collar is moved outwardly so as to again bring it into proper end thrust engagement with the bracket, and is secured in adjusted position by the set screw 13. As the collar is secured to the roller there is no danger of its being lost when the roller is removed for any reason. The flange on the end of the collar is provided to give a greater bearing surface than is afforded by the thickness of the collar itself. With this construction the roller may always be properly maintained in its bearings and prevented from wabbling.

What I claim as my invention is:

The combination with a supporting bearing and a printing roller having a reduced end portion journalled in said bearing and forming a shoulder with the portion of the roller of larger diameter, of a collar mounted on said portion of larger diameter and having a flanged end extending around said reduced end portion and engageable with the side of the bearing, said collar having a threaded opening and a set screw mounted in said opening for adjustably securing said collar to the roller.

In testimony whereof, I affix my signature.

ANDREW JOHNSON.